No. 660,476. Patented Oct. 23, 1900.
L. J. VOGT.
PHOTOGRAPHIC SHUTTER.
(Application filed Feb. 26, 1900.)
(Model.) 4 Sheets—Sheet 1.
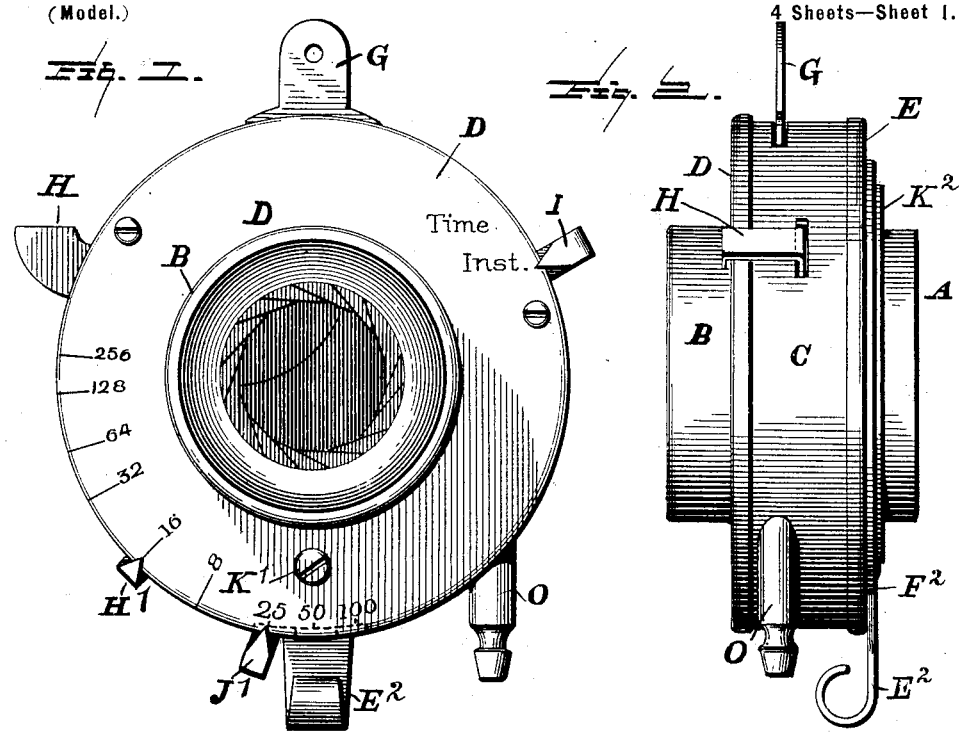
Witnesses:
L. C. Hills.
J. E. Morey.
Inventor:
Louis J. Vogt,
By Geo. B. Selden,
Atty.

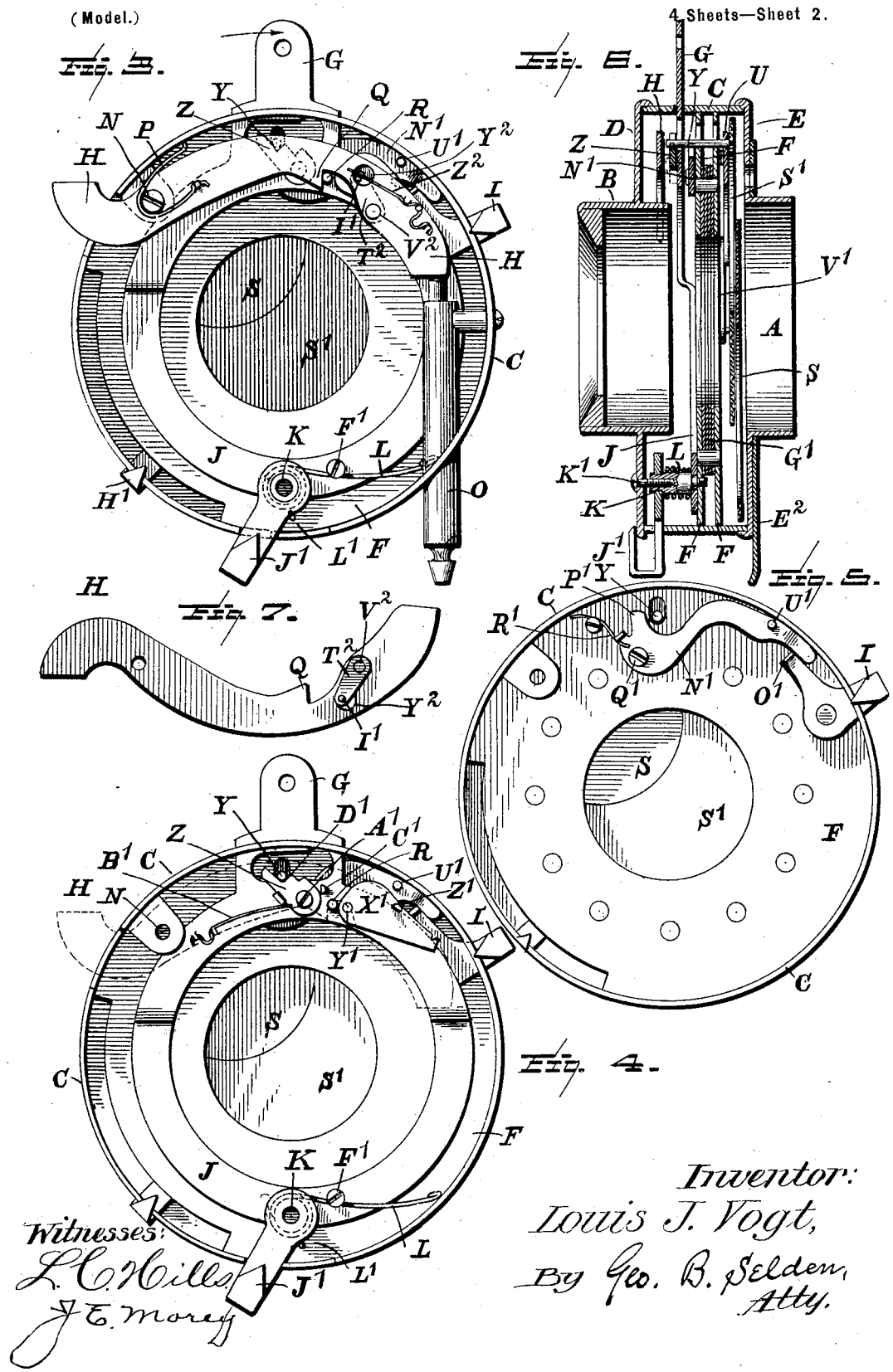

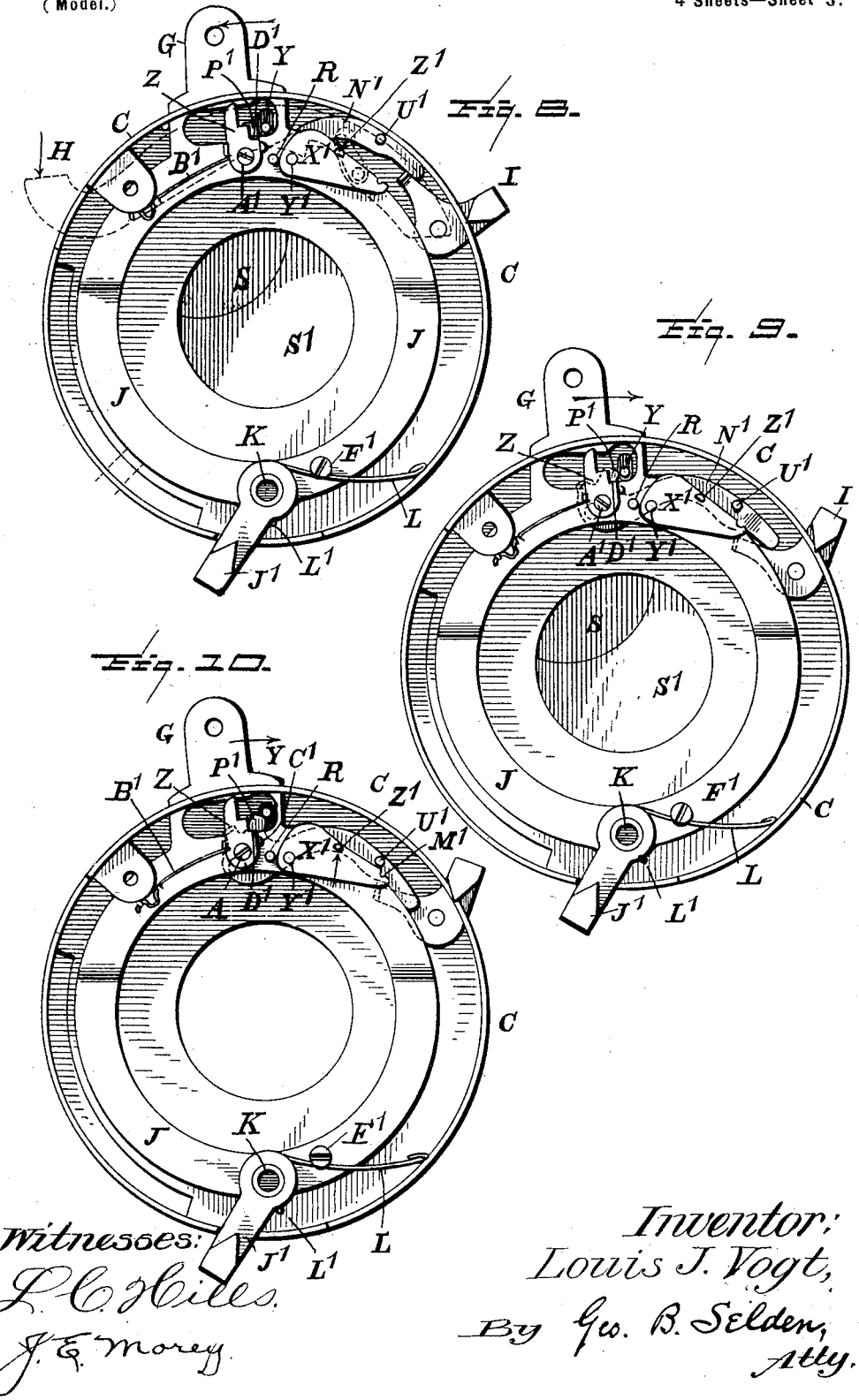

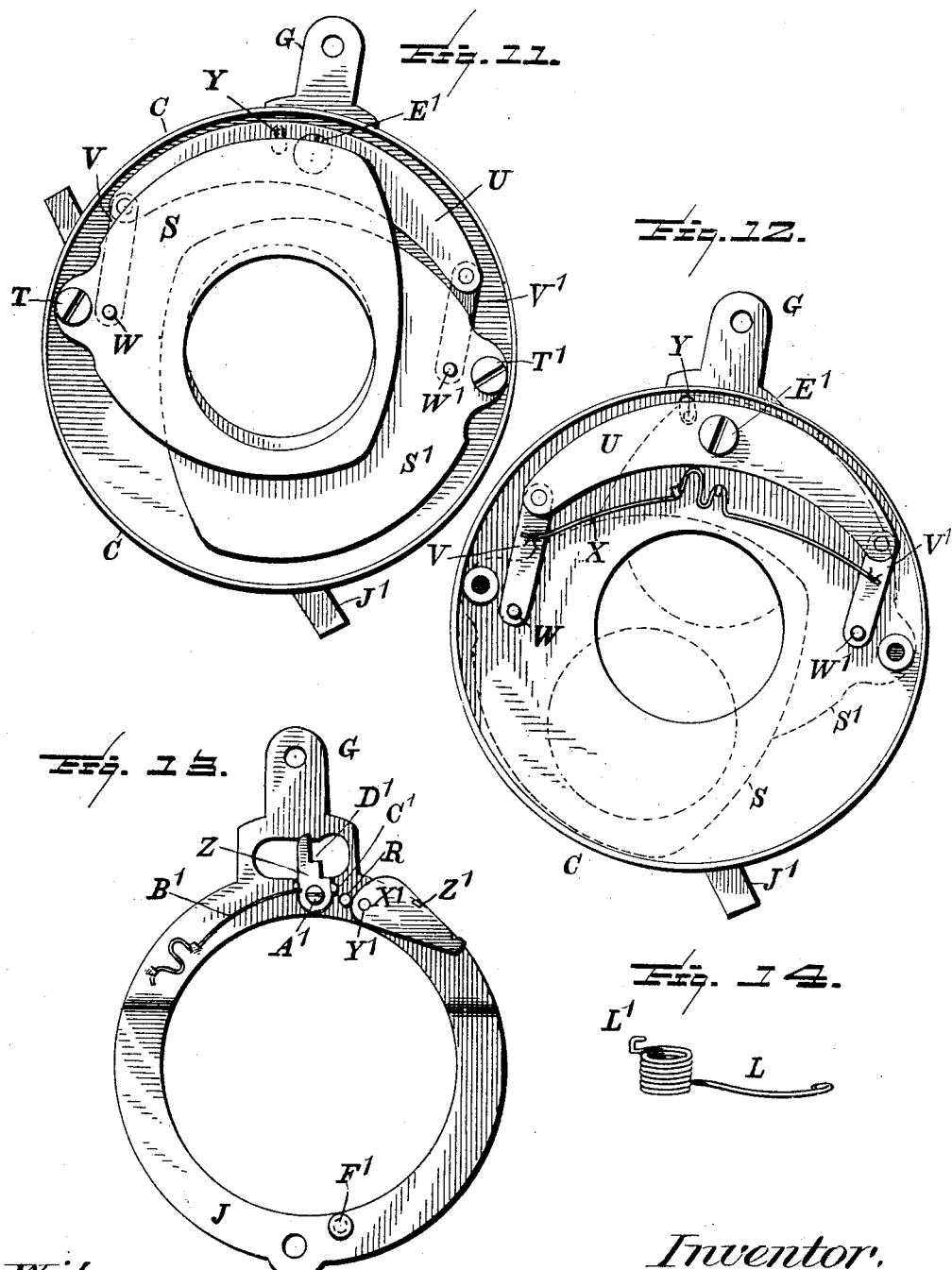

UNITED STATES PATENT OFFICE.

LOUIS J. VOGT, OF ROCHESTER, NEW YORK, ASSIGNOR TO THE VOGT OPTICAL COMPANY, OF SAME PLACE.

PHOTOGRAPHIC SHUTTER.

SPECIFICATION forming part of Letters Patent No. 660,476, dated October 23, 1900.

Application filed February 26, 1900. Serial No. 6,627. (Model.)

*To all whom it may concern:*

Be it known that I, LOUIS J. VOGT, a citizen of the United States, residing at Rochester, New York, have invented certain Improvements in Photographic Shutters, of which the following is a specification, reference being had to the accompanying drawings.

My invention relates to certain improvements in the construction and operation of photographic shutters whereby the same are simplified and cheapened.

My improvements are fully described and illustrated in the following specification and the accompanying drawings, the novel features thereof being specified in the claims annexed to the said specification.

In the accompanying drawings, representing a shutter embodying my improvements, Figure 1 is a front elevation. Fig. 2 is a side view of the shutter as seen from the left in Fig. 1. Fig. 3 is a front elevation, the forward plate being omitted and the shutter set for an exposure. Fig. 4 is a similar view, the release-lever being omitted. Fig. 5 is a front elevation showing the changing-lever and the stop-lever. Fig. 6 is a central vertical section. Fig. 7 represents the release-lever detached as seen from the rear. Fig. 8 is a front elevation, the release-lever being omitted and the parts shown in the positions they occupy at the end of an exposure. Fig. 9 is a front elevation showing the parts arranged for time or bulb exposures. Fig. 10 is a front elevation showing the parts in the positions they occupy during a time exposure. Fig. 11 is a rear elevation, the back plate being omitted and the blades shown open. Fig. 12 is a similar rear elevation showing the vibrating lever, links, and closing-spring. Fig. 13 represents the operating-lever detached in front view. Fig. 14 represents the spring on the operating-lever detached.

I have embodied my invention in the shutter which is represented in the accompanying drawings, in which it is shown as placed between the lenses of a photographic objective arranged in the tubes A and B; but it will be understood that my invention may be employed in various other relations. Any suitable lenses may be used on either or both sides of the shutter, as preferred. The shutter itself consists of a cylindrical casing C, a front plate D, a rear plate E, an intermediate diaphragm F, and the operating parts, as hereinafter described.

Levers or means for operating the shutter project outward beyond the cylindrical casing C—such as the setting-lever G, the releasing-lever H, and the changing-lever I. The shutter is set for an exposure by a movement of the lever G from left to right in Fig. 10, the set position being indicated in Figs. 1 and 3. The setting-lever G forms an exterior projection from the operating-lever J, which swings on the pivot K, being pressed constantly from right to left in Figs. 1 and 3 by the spring L. The operating-lever is provided with a central opening of sufficient diameter to allow the lever to vibrate without interfering with the passage of the light through the shutter. The releasing-lever H is pivoted on a suitable stud at N, being provided with the spring P, Fig 3, which gives the inner end of the lever a constant downward tendency. The operating-lever J is provided with a pin or lug R, which engages with the catch Q on the releasing-lever.

O represents an air-cylinder, the plunger of which acts to raise the inner end of the releasing-lever to release the pin R from the catch Q to produce the exposure by allowing the operating-lever to swing back to the unset position. The exposure is produced by the swinging apertured blades S S', which are shown open in Fig. 11. They are pivoted at T T', respectively, and are connected together by the vibrating lever U and the pivoted links V V'. The links are provided with studs W W', which engage in openings in the blades. A spring X, Fig. 12, attached to the diaphragm bears against lugs on the links and produces the return or closing movement of the blades and holds them closed except during an exposure. The vibrating lever U and the blades are operated from the lever J on the opposite side of the diaphragm by the stud Y and the dog Z, which is pivoted to the lever at A', Fig. 4, and provided with the spring B', which normally holds the dog in the upright position, as indicated in Figs. 8 and 9. The spring bears on a lug on the dog, and a stop C', Fig. 10, is placed on the operating-lever to limit the movement of the dog. The stud Y is secured in the vibrating lever U and passes through the diaphragm in a suitable slot and projects into the path of the dog Z, an aperture being made in the operating-lever to permit its swinging movement. When the operating-lever is set, the dog Z comes in contact with the stud Y and a notch D' on the side of the dog engages with the stud (see Fig. 4) and holds the lever in the set position until the exposure is produced by the movement of the exposing-lever. The oblique position occupied by the dog when the shutter is set is indicated in Figs. 3 and 4, and when the operating-lever is released, by the disengagement of the catch Q from the stud R, the dog straightens out and forces the stud Y outward, this movement operating the vibrating lever U and opening the blades by causing them to swing inward into the position indicated in Fig. 8, the closing movement being secured by the spring X, Fig. 12, after the notch D' in the dog has disengaged itself from the stud Y as the dog travels with the operating-lever back to the unset position. It will be observed that the dog is practically a toggle-lever, and consequently forces the stud Y outward in a very powerful manner. The blades are preferably made of hard rubber to secure strength and lightness.

The vibrating lever U is pivoted to the diaphragm at E', and as the stud Y is inserted in the lever at one side of this pivot the movement of the stud gives the lever the movement necessary to secure the opening of the blades, the closing being effected by the spring X.

It will be observed from Fig. 6 that the diaphragm F consists of two plates and that an iris-diaphragm G' of any suitable construction is placed between the plates, such diaphragm being arranged to be opened or closed by the lever H', a suitable scale being marked on the front D to indicate the size of the opening. The iris-diaphragm may, however, be omitted or placed in any other suitable relation with the lenses or the shutter.

To vary the tension of the spring L, which works the operating-lever, I provide the lever J' and place a suitable scale on the front D to indicate the length of the instantaneous exposure secured by the different degrees of tension given the spring. K is a stud inserted in the diaphragm on which the operating-lever J is pivoted. The spring L is coiled about the stud K and extends outward and bears against the interior of the case C. A screw or stud F' on the operating-lever J bears against the spring and when the lever is set imparts a certain degree of tension to the spring. At this tension the blades open and close at their least speed, and the instantaneous exposure is the longest that can be made with the shutter. To increase the speed and shorten the exposure, the lever J' still further increases the tension of the spring as it is moved along the scale. It operates by giving the spring coiled about the stud K an additional tension, the spring having a hooked end L', which engages the side of the lever J'. The lever is clamped on the stud by the spring or otherwise with sufficient friction to hold it in place wherever it may be set. A scale on the front D indicates the tension given the spring, and consequently the rapidity of the exposure. It will, however, be understood that any other suitable means of varying the tension of the spring may be employed. A screw K', Fig. 1, inserted in the stud K, assists in holding the front D in place.

The previous description relates to the shutter when used for instantaneous exposures. The mechanism for securing bulb or time exposures will now be described.

I is the changing-lever to adjust the shutter from instantaneous exposures to bulb or time exposures and it operates in the following manner: The position of the parts when the shutter is set for a time exposure is represented in Fig. 9. A lever N', pivoted to diaphragm at Q', Fig. 5, is provided with a stop P', which is interposed in the path of the pin Y and prevents its return, so that the blades are held open for the purpose of producing a time exposure. The stop P' is represented in Fig. 10 as engaged with the pin. The lever N' is provided with a spring R', Fig. 5, which gives the stop P' a constant tendency to swing into the path of the pin Y. The changing-lever I is provided with a lug O', Fig. 5, which bears against the lever N', and for instantaneous exposures shifts it outward, so as to keep the stop P' away from the path of the pin, as indicated in Fig. 5. For time exposures the lever I is shifted and the spring R' pushes the stop P' into the path of the pin Y as soon as it has been forced outward by the action of the operating-lever J and the dog Z. The pin is then arrested and prevented from returning inward, thus, through the vibrating lever U and the links V V', holding the blades S S' open, with their apertures coinciding with the central light-aperture through the shutter, and thus producing a time exposure. Such exposure is terminated by a movement of the releasing-lever H or by the movement of the setting-lever G, a feature which has never before been attained in a photographic shutter. To end the exposure and close the blades, the lever N' receives a movement which shifts the stop P' out of the path of the pin Y. The movement of the lever G to set the shutter will operate the releasing-lever, as the inclined surface of the catch Q rides along the pin R on the operating-lever J, to which the setting-lever G is affixed. The lever N' is provided with a pin U', projecting forward, and a movement of the releasing-lever acts on this pin to shift the lever N' and to move the stop P' out of the path of the pin Y. There is a movable dog X', Fig. 4, pivoted at Y' to the operating-lever J, and this dog is provided with a pin Z', receives motion from a pin I', Figs. 3 and 7, connected with the releasing-lever, so that the movement of the dog X' raises the lever N', and shifts the stop P' out of the path of the pin Y, thereby allowing the spring X to close the blades and terminate the exposure. When the blades are open, the pin U' on the lever N' rests against the outer or free end of the lever X', and an outward movement of the lever X' will shift the lever N' and carry the stop P' out of the path of the pin Y. The pin I', carried by the releasing-lever, acts against the pin Z' on the lever X', and shifts it outward when the releasing-lever is operated to terminate an exposure, either directly or by the setting-lever or by the bulb and the pneumatic attachment. The lever X' is provided with a lug M', Fig. 10, bent inward, so as to hold the lever X' in proper position relative to the operating-lever. The pin I' is not directly attached to the releasing-lever H, but is inserted in an arm $T^2$, pivoted thereon, (see Fig. 7) on the rear side thereof, so that it may yield around or over the pin Z' on the lever X' when the releasing-lever is making its first return movement after the pin R has been disengaged from the catch Q, so that the operating-lever J and its dog Z can open the blades. The arm $T^2$ is pivoted to the releasing-lever H at $V^2$, Figs. 3 and 7. The pin $I^2$ is fastened in the free end of the arm $T^2$ and projects inward to contact with the pin Z' on the lever X and outward through an opening $Y^2$, Fig. 7, in the releasing-lever, which opening permits the pin the requisite freedom of movement. On the outer side of the releasing-lever a spring $Z^2$, Fig. 3, attached to the lever and bearing against the pin I', permits its movement when it yields over the pin Z' on the first return movement of the releasing-lever, as already described.

It will of course be understood that the lever N' is arranged between the operating-lever and the diaphragm and that the various pins or catches described are made to project in the proper directions for the proper performance of the functions mentioned. It will also be understood that the instantaneous-exposure mechanism may be employed without the time-exposure devices. The operating-lever is offset, as shown, to adapt itself to the relative location of the parts.

My improved shutter is attached to the camera-front by any suitable means. In Figs. 1 and 2, $F^2$ represents a ring which is attached to the back E of the lens in any suitable way, so that it may be partially rotated. The ring $F^2$ is provided with a handle $E^2$, by means of which it may be manipulated. This ring fits over the tube A. $K^2$ represents another ring, which is permanently attached to the front and which coöperates with the ring $F^2$ in securing the shutter to the camera. This means for securing the shutter to the camera forms no portion of my present invention and is merely illustrated in showing one suitable means.

I claim—

1. In a photographic shutter, the combination of a casing, leaves pivoted within the casing, a lever also pivoted within the casing, links pivoted to the ends of said lever and to the said leaves, a spring connected with the said links for closing the leaves, and means for opening said leaves; substantially as described.

2. In a photographic shutter, the combination with a casing, leaves pivoted within the said casing, a lever also pivoted within the said casing links pivoted to the ends of said lever and to the said leaves, a stud on the said lever, and a spring connected with the said links for closing the said leaves; of an operating-lever pivoted in the casing, and a dog on the said operating-lever to engage the stud on the first-named lever; substantially as described.

3. In a photographic shutter, the combination with a casing, leaves pivoted within the said casing, a lever also pivoted in the said casing links pivoted to the ends of said lever and to said leaves, a stud on the said lever, and a spring connected with the said links for closing the leaves; of an operating-lever also pivoted in the casing, a dog on said operating-lever to engage the said stud on the first-named lever a spring arranged to swing the operating-lever to open the leaves, and means for holding the operating-lever in its set position and for releasing it therefrom; substantially as described.

4. In a photographic shutter, the combination with a casing, leaves pivoted within the said casing, a lever also pivoted in the said casing links pivoted to the ends of said lever and to said leaves, a stud on the said lever, and a spring connected with the said links for closing the leaves; of an operating-lever also pivoted in the casing, a dog on said operating-lever to engage the said stud on the first-named lever a spring arranged to swing the operating-lever to open the leaves, a stud on the said operating-lever, a releasing-lever pivoted in the casing and having a catch to engage the stud on the operating-lever, and a spring for holding the releasing-lever in engagement with the stud on the operating-lever, substantially as described.

5. In a photographic shutter, the combination with a casing, leaves pivoted in the casing, a spring-actuated lever also pivoted in the casing links pivoted to the ends of said lever and to the said leaves, a spring-actuated operating-lever also pivoted in the casing and engaging the aforesaid lever to open the said leaves, and means for holding said operating-lever in its set position and for releasing the same; of a pawl pivoted in the casing and arranged to engage said stud for holding the leaves open, and means for releasing the stud from the pawl; substantially as described.

6. In a photographic shutter, the combination with a casing, leaves pivoted in the casing, a spring-actuated lever also pivoted in the casing links pivoted to the ends of said lever and to the said leaves, and having a stud thereon, a spring-actuated operating-lever also pivoted in the casing and having a dog engaging the said lever to open the said leaves, and means for holding said operating-lever in its set position and for releasing the same; of a pawl pivoted in the casing and arranged to engage said stud for holding the leaves open, and means for releasing the stud from the pawl; substantially as described.

7. In a photographic shutter, the combination with a casing, leaves pivoted in the casing, a spring-actuated lever also pivoted in the casing links pivoted to the ends of said lever and to said leaves, and a spring-actuated operating-lever for opening the said leaves; of a pawl arranged to retain the leaves in their open position, and means for releasing the leaves from the pawl; substantially as described.

8. In a photographic shutter, the combination with a casing, leaves pivoted in the casing, a spring-actuated lever also pivoted in the casing links pivoted to the ends of said lever and to said leaves, and a spring-actuated operating-lever for opening the said leaves; of a pawl arranged to retain the leaves in their open position, and a dog pivoted on the said operating-lever and arranged to engage the said pawl to release the same, substantially as described.

9. In a photographic shutter, the combination with a casing, leaves pivoted in the casing, a spring-actuated lever also pivoted in the casing links pivoted to the ends of said lever and to said leaves, and a spring-actuated operating-lever for opening the said leaves, of a pawl arranged to retain the leaves in their open position, a changing-lever for setting the said pawl, and a dog pivoted on said operating-lever to release the pawl; substantially as described.

10. In a photographic shutter, the combination with a casing, leaves pivoted in said casing, a spring-actuated lever also pivoted in the casing links pivoted to the ends of said lever and to said leaves, a spring-actuated operating-lever for opening the leaves, and a releasing-lever for retaining the operating-lever in its set position and for releasing it therefrom, of a pawl arranged to retain the leaves in their open position, a dog pivoted on the operating-lever to act on said pawl and a dog pivoted on the releasing-lever and engaging said dog on the operating-lever to release the said pawl; substantially as described.

LOUIS J. VOGT.

Witnesses:
J. E. MOREY,
GEO. B. SELDEN.